Jan. 16, 1945.  A. W. BAIRD  2,367,257
ELECTRIC PLUG OR RIVET WELDING APPARATUS
Filed Dec. 18, 1942  3 Sheets-Sheet 3

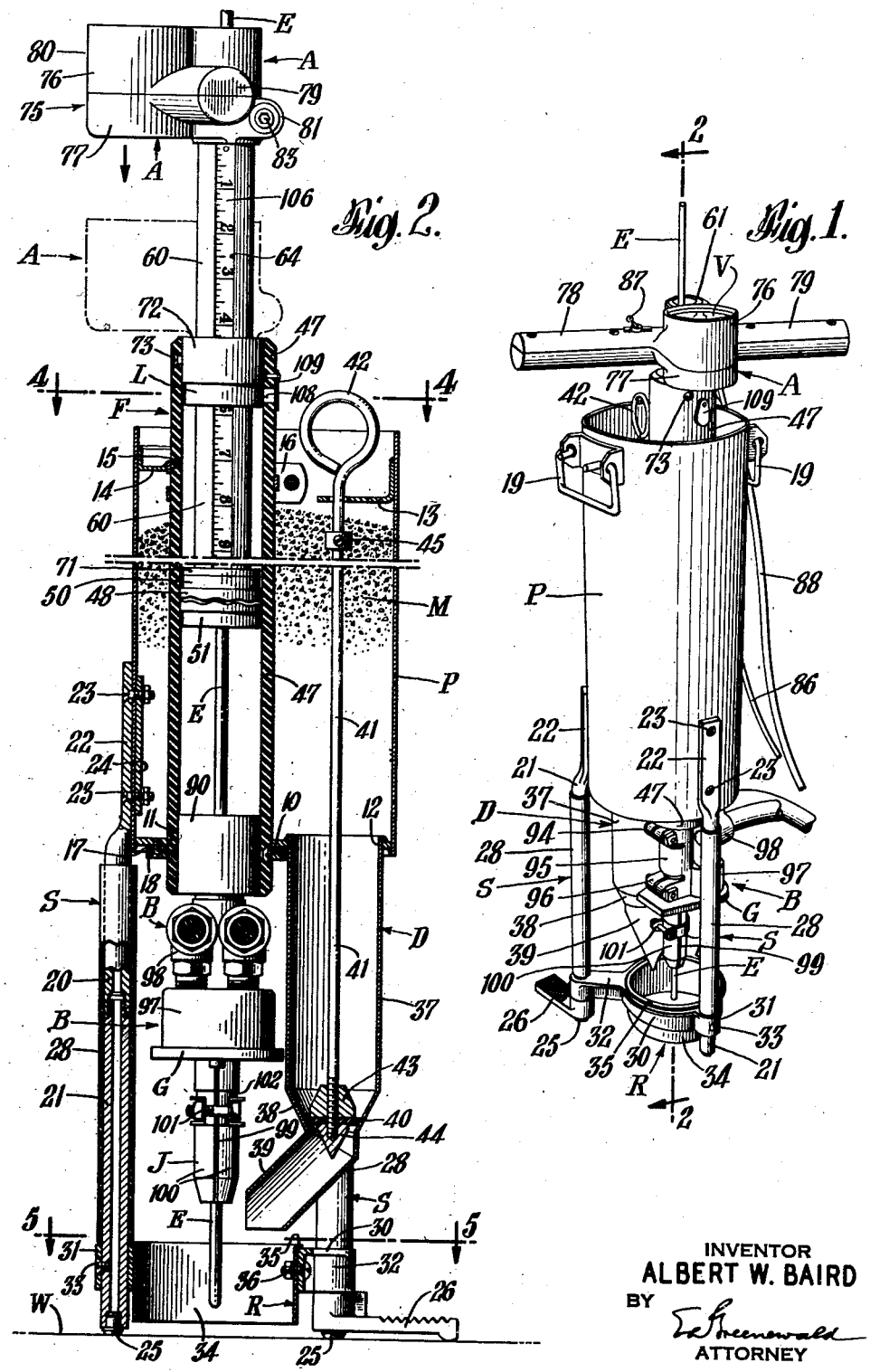

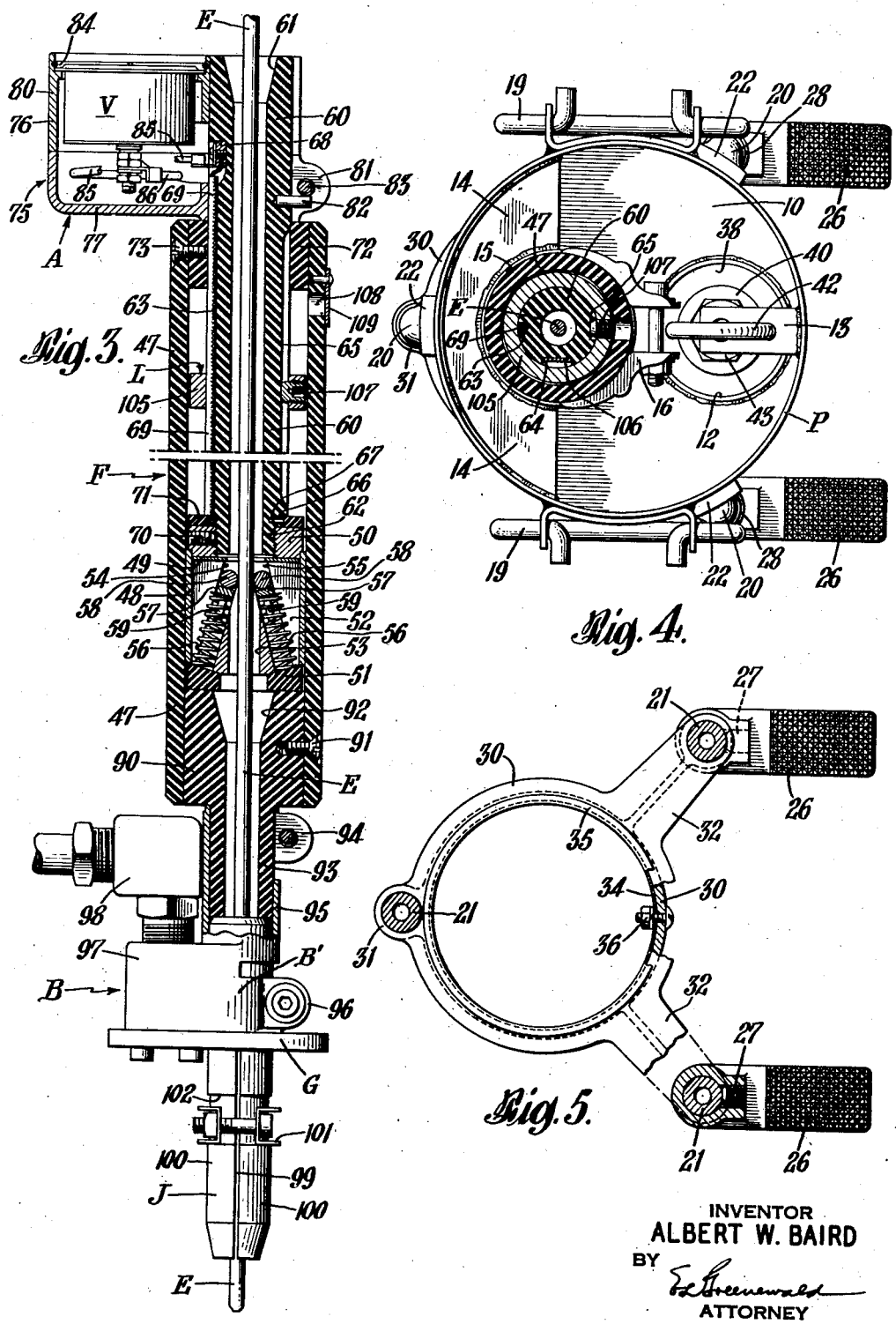

INVENTOR
ALBERT W. BAIRD
BY
ATTORNEY

Patented Jan. 16, 1945

2,367,257

UNITED STATES PATENT OFFICE 2,367,257

ELECTRIC PLUG OR RIVET WELDING APPARATUS

Albert W. Baird, Cranford, N. J., assignor to The Linde Air Products Company, a corporation of Ohio Application December 18, 1942, Serial No. 469,396

20 Claims. (Cl. 219—8)

This invention relates to electric welding apparatus and more particularly to a semi-automatic electric rivet or plug welding apparatus.

The objects of the invention are to provide a semi-automatic electric rivet or plug welding apparatus embodying means for feeding a welding electrode toward the work to be welded; to provide such an apparatus embodying means whereby the distance between the fusible end of the welding rod and the work may be readily maintained at a constant value; to provide means to feed a predetermined length of welding rod to the work in any given operation; to provide means to deposit a predetermined quantity of a granular fusible mineral welding material on the work to be welded and to retain the same in position on the work; to provide easily portable apparatus for feeding a welding electrode toward the work to be welded and for feeding a quantity of a granular fusible mineral welding material toward the work to be welded, which apparatus is provided with means for assuring a predetermined length of welding rod being fed to the work in any operation; and to provide a semi-automatic welding apparatus which is simple in construction and efficient in operation.

These and other objects of the invention will in part be obvious and in part become apparent from the following description and accompanying drawings, in which:

Fig. 1 is an elevation view of one form of apparatus embodying the principles of the invention;

Fig. 2 is a vertical sectional view of the apparatus taken along line 2—2 of Fig. 1 looking in the direction of the arrows;

Fig. 3 is an elevation view, partly in section, illustrating a welding rod feeding mechanism forming part of the present invention;

Fig. 4 is a plan view, partly in section, on the line 4—4 of Fig. 2 looking in the direction of the arrows;

Fig. 5 is a plan view, partly in section, on the line 5—5 of Fig. 2 looking in the direction of the arrows;

Figure 6:
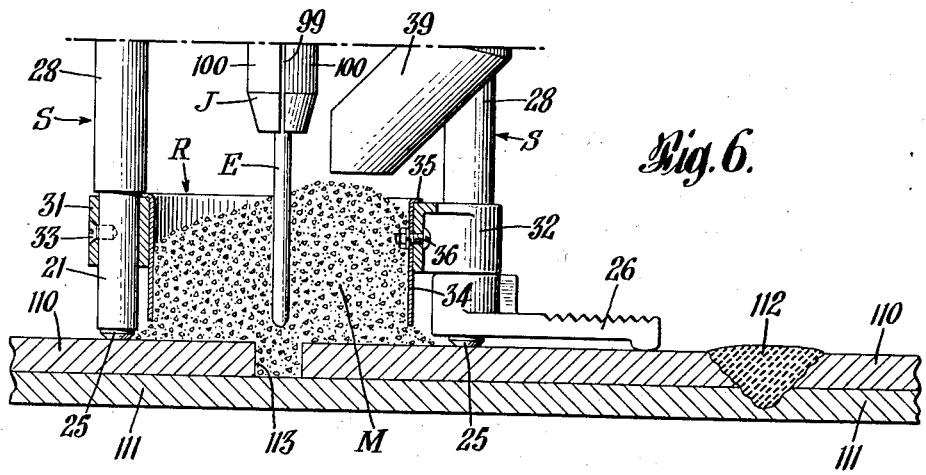
Fig. 6 is an elevation view, partly in section, illustrating the apparatus in position to form a rivet or plug weld between two plates.

The invention is particularly adapted for use with the welding process described and claimed in Jones et al. Patent No. 2,043,960, in which the welding operation is submerged beneath a quantity of a granular fusible mineral welding material which is prefused and substantially free of substances evolving deleterious amounts of gas at elevated welding temperatures. For this purpose, the apparatus includes a suitable container, such as a pot or hopper for the granular welding material, and the container is spaced above the work to be welded by support means. Discharge means are provided to conduct the welding material from the container to the welding region where the material is retained on the work by suitable means such as a ring secured to the support means. A reciprocable welding rod or electrode feeding means or mechanism is mounted in the container and operated by means of a handle assembly provided with a voltmeter or other indicating means which an operator can observe to maintain the welding voltage or current, and hence the distance between the fusible end of the electrode and the work, at a substantially constant value. The welding current is supplied to the welding rod or electrode by a bus bar assembly including a current carrying contact jaw or nozzle. In order that a preselected length of welding rod, consistent with the amount of weld metal to be deposited, may be fed to the work in any given welding operation, adjustable limiting means are provided to limit the stroke of the reciprocable feeding means.

Referring more particularly to Figs. 1 and 2 of the drawings, the apparatus comprises container means, such as a pot or hopper P, for granular fusible welding material M. The container P is supported above the work by support means, such as detachable legs S; and discharge means, such as a conduit D, conducts the welding material to the work W where it is retained in position by suitable retaining means, such as a retaining ring R, detachably secured to the support means S.

A welding rod or electrode feeding means or mechanism F extends longitudinally of hopper P and is operated by a handle assembly A on which is secured indicating means, such as a voltmeter V, which enables an operator to observe the welding voltage so as to maintain a substantially constant distance between the end of a fusible welding rod or electrode E and the work W. A bus bar assembly B, provided with welding current carrying cable terminals and a flexible contact jaw or nozzle J, is secured to the lower end of the feeding means. In order that the length of the welding rod to be fed to the work in any given operation may be preselected in consistency with the amount of weld metal to be deposited, a limiting means L is adjustably mounted on the handle assembly and limits the stroke of the reciprocable feeding means F.

The pot or hopper P is a tubular member, preferably cylindrical in shape, the lower end of which is closed by a plate 10 formed with apertures 11 and 12. Inside the upper end is secured, as by welding, an apertured angle bracket 13 and a segment-shaped plate 14 formed with a semi-circular recess 15 in which is secured, as by welding, a split clamp 16. An annular washer 17 of flexible material and a flat ring 18 are secured to the plate 10 in axial alignment with aperture 11.

Handles 19 are provided on the container P for moving the apparatus from one location to another, and the container is spaced from and supported on the work W by supporting means comprising legs S, preferably three in number, detachably secured to the container.

The legs S comprise joined upper and lower tubular sections or rods 20 and 21, each upper section being flattened at its upper end 22 for securement to hopper P by bolts 23 passing through the hopper wall and through plates 24 inside the hopper. A leg button 25 is secured in the lower end of each lower section 21 and foot or toe plates 26 are adjustably secured to two of the legs by set screws 27. An insulating sleeve 28 surrounds each leg for the major portion of its length.

The welding material retaining means R includes an annular bracket 30 formed with an apertured ear 31 and radially extending apertured arms 32. The ear 31 engages the leg S not provided with a foot or toe plate 26 and is secured thereto by a set screw 33, while the apertured arms 32 engage the other legs S above the foot plates 26. The annular bracket 30 is thus offset from the axis of hopper P. A cylindrical retaining member or ring 34, formed with a flange 35, is set in the bracket 30 and retained therein by bolt and nut 36.

The welding material M is delivered from the container or pot P to the retaining means R by the discharge means D, which comprises a preferably cylindrical conduit 37 secured by welding in aperture 12 in plate 10 and formed with a funnel-shaped lower end 38 terminating in a spout 39 having its lower end above the retaining means R. Discharge of the granular material is controlled by a control gate or valve 40, formed of flexible material such as sheet rubber. The valve 40 is operated by a control rod 41 extending longitudinally of the hopper P and conduit 37 from the lower end 38 of the conduit through the apertured angle bracket 13. The upper end of rod 41 is formed with an operating handle 42 and the lower end is threaded to receive a nut 43 and a spear head 44. Valve 40 is secured between the members 43 and 44, and a stop 45 is adjustably secured to rod 41 to control the amount of opening of the valve.

The welding rod or electrode feeding means or mechanism F is enclosed in tubular member 47 of insulating material which extends through the aperture 11 of plate 10 and through clamp 16. The member 47 is adjustable lengthwise of hopper P through the medium of clamp 16 and is frictionally held in position by flexible washer 17.

Mechanism F comprises a sleeve 48 fitting closely in member 47, an apertured metallic end plate 49, and internally threaded annular metallic flange or nut 50, an apertured end plate 51 of insulating material, and a cylindrical block 52, all united by suitable fastening means into a suitable cartridge or unit. Block 52 is formed with an axial bore or passage 53 at least larger in diameter than the largest size of welding rod to be handled by the apparatus. At its upper end, bore 53 is intersected by rearwardly converging bores or passages 54 and 55, which preferably are substantially rectangular in cross section. Bores 54 and 55 receive springs 56, roller aligning blocks 57 and rollers 58. Blocks 57 are C-shaped and have a cross section similar to that of bores or passages 54, 55. Each block is formed with a central pin 59 to receive one of the springs 56, which latter abut plate 51 and blocks 57.

Springs 56 urge blocks 57 and rollers 58 upwardly and radially inwardly along conperging bores 54, 55. As the feeding means F moves downwardly along electrode E, the rollers tend to move further inwardly under the influence of springs 56 and grip the electrode. On upward movement of the means F, the rollers 58 move outwardly along bores 54, 55 and do not grip the electrode. The means F thus acts as a one-way clutch, gripping the electrode when moved in one direction and releasing the electrode when moved in the opposite direction.

The rod feeding means F is operated by the handle assembly A. The handle assembly includes a tubular member or plunger 60 of insulating material, having a flared upper entrance opening 61 and a lower reduced threaded extension 62, and formed with three longitudinally extending circumferentially spaced grooves 63, 64, and 65. A metallic washer 66 is threaded on extension 62 and locked in position by a pin 67, and this washer is formed with a notch or groove in its periphery, which notch or groove registers with groove 63 in plunger 60 when the washer is assembled on the plunger. The groove 63 is enlarged at its upper end to receive a terminal 68, and an electric conductor or cable 69 is sealed in groove 63, connected at its upper end to terminal 68 and soldered at its lower end in the notch in washer 66.

The mechanism F is secured to plunger 60 by the flange or nut 50 which is threaded onto extension 62 into tight electrically conductive contact with washer 66 and locked in position by a set screw 70. An insulating washer 71 surrounds washer 66 and is held against the shoulder formed by extension 62 by the flange or nut 50. An insulating bushing 72 is secured in the upper end of member 47 by screws 73 so that handle assembly A is guided for sliding movement in member 47 by bushing 72 and sleeve 48.

A combined handle and voltmeter housing member 75 is secured to the upper end of plunger 60. The member 75 is divided into upper and lower sections 76 and 77, and includes laterally extending handles 78 and 79, a housing 80 and a split clamp 81 by means of which the member 75 is secured to plunger 60. A pin 82 in the plunger 60 abuts a bolt 83 forming part of the split clamp 81 to position member 75 on the plunger 60.

In order that an operator of the welding apparatus may readily observe the welding voltage, which is indicative of the distance between the fusing end of the electrode E and the work W, the voltmeter V is placed in the housing 80 and retained therein by a snap ring 84. One terminal of the voltmeter is connected by a conductor 85 to the terminal 68, and the other voltmeter terminal is connected to the work W through a conductor 86. Terminal 68 is in electrically conductive relation with electrode E through conductor 69, metallic washer 66 and the feeding mechanism F. The welding potential will thus be impressed on voltmeter V. By observing the indications of voltmeter V, the operator can manipulate the handle assembly A, and thus the feeding mechanism F, to maintain the welding voltage, and therefore the distance between the fusing end of electrode E and the work, at a substantially constant value. In order that the operator may readily control the starting and stopping of the welding operation, a remote control switch 87 is mounted in the handle 78 and connected by a cable 88 with a suitable remotely-operated contactor (not shown) controlling the flow of welding current.

The means for conducting welding current to the electrode E comprises the bus bar assembly B. A bushing 90, of insulating material, is secured in the lower end of member 47 by screws 91 and is formed with a flaring entrance opening 92 to receive electrode E and with a reduced extension 93. The bus bar assembly B includes a bus bar B', guard plate G and contact jaw or nozzle J. Bus bar B' comprises a split clamp 94 secured to extension 93, a cylindrical portion 95 engaging extension 93 and jaw J, a split clamp 96 secured to jaw J, and a welding current cable terminal block 97 in which are mounted cable terminals 98. Guard plate G is secured to and extends outwardly beyond block 97. The contact jaw or nozzle J is a generally cylindrical member formed with longitudinally extending slots 99 which divide the lower end of the jaw into flexible fingers 100. A clamp 101 seated in an annular recess 102 in jaw J controls the pressure which fingers 100 exert against electrode E. The pressure preferably is just sufficient to prevent upward movement of electrode E upon upward movement of feeding mechanism F, and the fingers 100 of jaw J thus act as means restraining movement of the electrode when mechanism F is moved upwardly.

In electric rivet or plug welding, it is desirable that a given length of welding rod consistent with the amount of weld metal to be deposited is fed to the welding zone in any one operation. For this purpose, adjustable limiting means L are provided to limit the stroke of the reciprocable electrode feeding means F. The limiting means L comprises a collar 105 adjustable longitudinally of plunger 60 and a scale 106 secured in groove 64. The scale 106 is suitably graduated in units of linear measurement and its zero point is adjacent member 75. The collar 105 is secured in adjusted position on plunger 60 by a set screw 107 extending into groove 65. For the purpose of adjusting collar 105, an aperture 108 is formed in member 47 in such a position that, when collar 105 abuts bushing 72, set screw 107 will be aligned with aperture 108. The aperture 108 is closed by a swinging plate 109. In operation, set screw 107 is loosened and plunger 60 is pulled upwardly until the portion of scale 106 above bushing 72 corresponds with the amount of welding rod to be fed to the welding zone. Set screw 107 is then tightened. Handle assembly A is then permitted to drop and electrode E is pushed through the apparatus until its lower end is the desired distance from work W. Fingers 100 of jaw J are tightened by clamp 101 to exert a gripping action on the electrode. The handle assembly A is then pulled up until collar 105 abuts bushing 72. When the desired length of welding rod or electrode has been fed to the welding zone, member 75 will abut bushing 72 and prevent further feeding of the electrode.

The operation of the apparatus will be described for the arrangement shown in Fig. 6, wherein plates 110 and 111 are to be joined by rivet welds, a completed one of which is shown at 112. An aperture 113 is formed in the upper plate 110 and the welding apparatus is so located that electrode E will be centered over the aperture. The limiting means is then adjusted, as just described, so that the apparatus will feed a predetermined length of electrode to the welding zone. Electrode E is pushed through the apparatus until its lower end is the desired distance from the work, and fingers 100 of jaw J are tightened to exert a gripping action on the electrode. A piece of combustible material, such as steel wool, is then placed between electrode E and the work and gate valve 40 is lifted to discharge a quantity of welding material M from hopper P onto the work inside retaining means R. Sufficient material M should be discharged around electrode E to form a hydrostatic head of welding material sufficient to prevent the molten slag, formed by fusion of the welding material M, building up along electrode E and overheating the same.

To start the welding operation, the operator places his feet on the toe plates or foot plates 26 and pulls handle assembly A upwardly until collar 105 abuts bushing 72. He then actuates switch 87 to initiate the flow of welding current, which latter first burns away the steel wool pad and then melts metal from the welding rod and the work and fuses material M. Alternatively, the lower end of welding rod E is sharpened to a point which contacts the work, and this point burns away to start the welding operation. As the electrode or welding rod E melts, the operator moves handle assembly A downwardly at such a rate that the voltage indicated on voltmeter V remains substantially constant. Upon downward movement of the handle assembly, the rollers 58 of feeding mechanism F move inwardly to grip electrode E and move it downwardly also. The feeding of the electrode is continued until member 75 abuts bushing 72, whereupon the flow of current continues to melt metal from rod E until the distance between the end of the rod and the work increases to an extent causing a large rise in welding voltage, as indicated on voltmeter V. The current is then interrupted by actuation of switch 87. The unfused portion of material M is recovered for re-use and the fused portion, upon cooling, becomes brittle and breaks away from the weld. When completed, the weld has a smooth top surface, as shown at 112, which is devoid of a crater.

Figure 7:
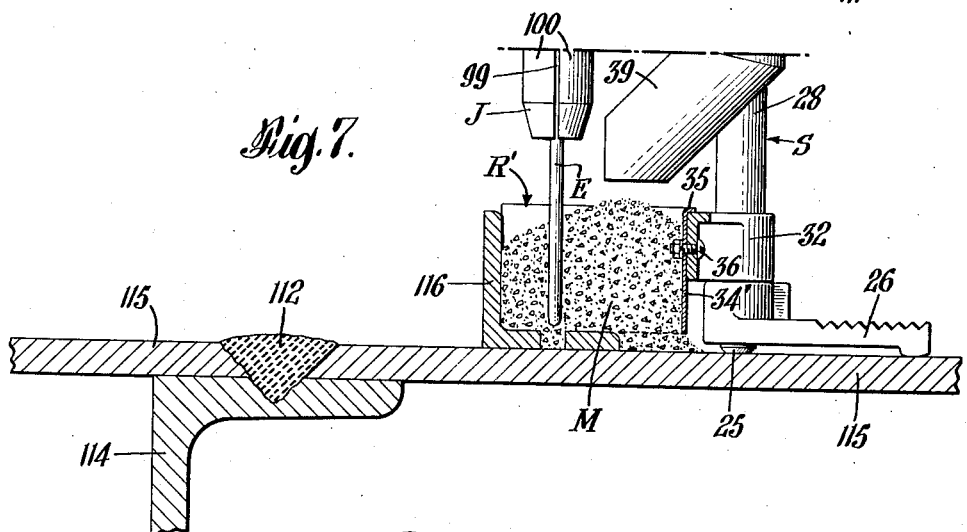
Fig. 7 is an elevation view, partly in section, illustrating a modified form of the apparatus in position to form a rivet or plug weld between a plate and a structural member.
Figure 8:
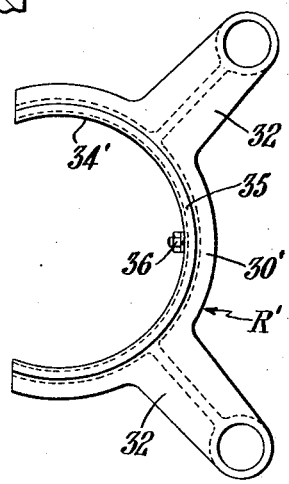
Fig. 8 is a plan view of an element forming part of the apparatus illustrated in Fig. 7.

The apparatus is readily adaptable to various types of rivet welding operations, as in securing an angle bar 114 to the underside of a plate 115, as in Fig. 7. To weld an angle bar 116 to the upper side of plate 115, slight adjustments must be made. Thus, in the illustration at the right of Fig. 7, one leg S is removed and the retaining means R' rests on the horizontal leg of the angle bar. Retaining means R' differs from the retaining means R in that bracket 30' and ring 34' are cut away to form an open-sided bracket and ring and the vertical leg of angle bar 116 completes the retaining means enclosure for the welding material M. The welding operation is performed as previously described.

From the preceding description, it will be apparent that the welding apparatus of the present invention is a practical device of great utility. Relatively large welding rods or electrodes may be positively fed to the work by the feeding mechanism F and relatively large welding currents may be employed. Additionally, the position of the fusing end of the electrode relative to the work may be accurately controlled by observation of the indicating means V. By adjusting the limiting means L, the length of electrode fed to the welding zone may be accurately controlled and maintained constant for successive welding operations requiring the same amount of deposited weld metal. The welding material discharge means D and retaining means R provide for maintaining a controlled amount of welding material on the work. Finally, the apparatus is light and readily transportable by the handles 19 and may be easily disassembled for repair or interchange of parts.

While specific embodiments of the invention have been illustrated and described in detail, it will be obvious that changes, such as in the size and location of parts, may be made without departing from the principles of the invention.

What is claimed is:

1. Welding apparatus for repetitively welding any one of a number of lengths of fusible metal rod to metal work, such apparatus comprising, in combination, reciprocable means including means for gripping such rod; guiding means for guiding said reciprocable means toward and away from the work, said guiding means being adapted to be set in a stationary position relatively to the work during the welding operation; adjustable means associated with said reciprocable means and settable to predetermined the permissible length of the stroke of said reciprocable means toward the work in accordance with the selected length of rod to be welded to the work; means for advancing said reciprocable means along said guiding means to move said rod toward the work; and mutually cooperating means on said reciprocable means and said guiding means to limit the length of the stroke of the reciprocable means toward the work in accordance with the permissible length of stroke predetermined by said adjustable means.

2. Electric welding apparatus comprising, in combination, a tubular member; a pair of insulating bushings each secured in one end of said tubular member; reciprocable welding rod feeding means mounted in said tubular member; a plunger secured to said means and extending outwardly through one of said bushings; a handle fixedly secured to the outer end of said plunger; and a collar adjustably secured to said plunger between one of said bushings and said welding rod feeding means, said handle and said collar limiting the stroke of said plunger and of said welding rod feeding means.

3. Welding apparatus as claimed in claim 1, wherein such adjustable means includes a member movable along said reciprocable means and securable in any one of a number of positions lengthwise of a scale associated with said reciprocable means.

4. Welding apparatus as claimed in claim 1, wherein said reciprocable means has a scale thereon extending lengthwise thereof, and such adjustable means includes a collar slidable along said reciprocable means and securable thereto in any one of a number of positions relatively to said scale to predetermine said permissible length of stroke.

5. Manually operable and portable welding apparatus for welding a length of fusible metal rod to metal work, such apparatus comprising, in combination, reciprocable means including means for gripping such rod and for connecting the latter to a source of welding current; guiding means for guiding said reciprocable means toward and away from the work, said guiding means being adapted to be set in a stationary position relatively to the work; mutually cooperating means on said reciprocable means and said guiding means to limit the length of the stroke of the reciprocable means toward the work; a handle connected to said reciprocable means for manually advancing the latter along said guiding means to move said rod toward the work; and electrically-operable indicating means carried by said reciprocable means adjacent said handle, said indicating means being connected in circuit with said rod gripping means and adapted to be connected in circuit with the rod and the work and, during the manual advance of said reciprocable means toward the work, serving to continuously indicate to the operator of said handle the rate of such advance and also serving to indicate to said operator the completion of the stroke of said reciprocable means.

6. Electric welding apparatus comprising, in combination, a hopper adapted to contain a supply of granular fusible mineral welding material; means supporting said hopper in spaced relation above the work to be welded; reciprocable welding rod feeding means mounted in said hopper and adapted to feed a welding rod longitudinally of said hopper toward the work to be welded; welding material retaining means secured to such supporting means adjacent the work to be welded and aligned with said welding rod feeding means; and welding material discharge means leading from said hopper to said welding material retaining means.

7. Electric welding apparatus as claimed in claim 6, in which said supporting means comprises a plurality of elongated members secured to said hopper in circumferentially spaced relation to each other; and said welding material retaining means comprises a bracket secured to the lower ends of said elongated members and a ring detachably secured to said bracket.

8. Electric welding apparatus as claimed in claim 6, in which said hopper includes an apertured bottom plate, and said discharge means comprises a conduit secured in an aperture in said bottom plate and extending downwardly from said hopper; a discharge spout extending laterally from the lower end of said conduit toward said retaining means; and valve means for controlling the discharge of material from said hopper through said conduit and discharge spout to said retaining means.

9. Electric welding apparatus comprising, in combination, a container for granular fusible mineral welding material; a tubular member disposed in said container and extending through the bottom thereof; means detachably securing said tubular member in said container; means supporting said container in spaced relation above the work to be welded; welding electrode feeding means reciprocably mounted in said tubular member and adapted, upon movement in a downward direction, to grip a welding electrode and advance the same toward the work to be welded, and, upon movement in an upward direction, to move freely of said electrode; a handle assembly for operating said reciprocable means; a bus bar assembly secured to said tubular member and adapted to conduct electric welding current to a welding electrode; means for discharging welding material from said container onto the work to be welded; and means secured to said supporting means for retaining said discharged welding material in the welding zone around the fusible end of an electrode fed toward the work by said reciprocable means.

10. Electric welding apparatus as claimed in claim 9, including a pair of bushings each secured in one end of said tubular member; said handle assembly comprising a plunger extending upwardly beyond one of said bushings and secured at its lower end to said reciprocable welding electrode feeding means; means adjustably secured to said plunger between said one bushing and said feeding means for limiting the stroke of said plunger and said feeding means; and a handle secured to the upper end of said plunger.

11. Electric welding apparatus comprising, in combination, means for feeding a predetermined length of welding rod toward the work to be welded; means for conducting electric welding current to said welding rod; means for indicating the distance between the fusing end of said welding rod and the work to be welded; means for depositing a granular fusible mineral welding material on the work; means for retaining said welding material around the fusing end of said welding rod; and means for supporting said rod feeding means, said depositing means, and said retaining means in spaced relation above the work to be welded.

12. Electric welding apparatus as claimed in claim 11, in which said supporting means comprises a plurality of elongated members secured to the lower end of said depositing means in circumferentially spaced relation to each other; and toe plates secured to certain of said elongated members and extending perpendicularly thereto; said retaining means comprising a bracket secured to said elongated members adjacent the work to be welded and a ring detachably secured to said bracket.

13. Electric welding apparatus as claimed in claim 11, in which said supporting means comprises two elongated members secured to said depositing means in circumferentially spaced relation to each other; toe plates adjustably secured to said members and extending at right angles thereto; said retaining means comprising an open-sided annular bracket secured to said elongated members, with the open side of the bracket being disposed away from said members, and an open-sided ring detachably secured to said open-sided bracket.

14. Electric welding apparatus comprising, in combination, a hopper adapted to contain welding material; retaining means for retaining a quantity of such material upon a portion of the work to be welded; means for discharging welding material from said hopper into said retaining means; and welding rod feeding means carried by said hopper and operable to feed a welding rod into said quantity of material and toward said portion of the work.

15. Electric welding apparatus as claimed in claim 14, in which said hopper, said retaining means and said means for discharging welding material are secured together and constitute a portable unitary assembly, and said welding rod feeding means constitutes a unitary assembly removable from and replaceable on the first-mentioned assembly and adjustable relatively thereto.

16. Electric welding apparatus as claimed in claim 14, in which said welding rod feeding means is insulated from said hopper and at least part of such feeding means is disposed within said hopper.

17. Electric welding apparatus for welding a predetermined length of fusible metal rod to a work surface, comprising in combination, means for feeding said predetermined length of rod toward said work surface; means for conducting electric welding current to said rod; means for supporting said feeding means upon and in spaced relation to said work surface; and means carried by said supporting means for retaining granular fusible welding material around the fusing end of said rod.

18. Electrical welding apparatus for welding a predetermined length of fusible metal rod to work surface, comprising in combination, means for feeding said predetermined length of rod toward said work surface, said feeding means comprising a tubular member, a plunger reciprocable in said tubular member, and means carried by said plunger for gripping said rod; means for supplying electric welding current to said rod; means for supporting said tubular member substantially perpendicular to and in spaced relation from said work surface; and means carried by said supporting means for retaining granular fusible welding material on said work surface around juxtaposed portions of said rod and said work surface.

19. Electric welding apparatus for welding a predetermined length of fusible metal rod to a metal surface, which comprises means adapted to engage said surface and position the rod perpendicular to said surface with one end of the rod in spaced relation with respect to said surface to leave a space between such rod end and said surface to receive granular fusible mineral welding material; means carried by such rod-positioning means for retaining granular material around juxtaposed portions of said rod end and said surface; means for passing from said rod end through said granular material to said surface an electric current of sufficient magnitude to fuse at least a portion of said material and melt adjacent portions of said rod and said surface; and means for advancing said rod toward said surface.

20. Portable electric welding apparatus for welding a predetermined length of fusible metal rod to metal work, such apparatus comprising, in combination, a tubular member; means secured to said member for supporting the same in a stationary position upon a surface of the work, with the longitudinal axis of said member perpendicular to said surface; a reciprocable assembly extending axially through and guided by said tubular member, said assembly including rod-engaging means and an electric current supply terminal both below said tubular member, and means above said tubular member for advancing said assembly and said rod perpendicularly toward said surface; and a device below said tubular member for retaining granular fusible mineral welding material around juxtaposed portions of said surface and the end of said rod, said device being secured to said tubular member and movable therewith from one welding position to another.

ALBERT W. BAIRD.